United States Patent [19]
Bartelt et al.

[11] Patent Number: 5,723,051
[45] Date of Patent: Mar. 3, 1998

[54] GAP FILTER FOR LIQUIDS OR GASES

[75] Inventors: Bertram Bartelt, Steinheim; Peter Gohle, Pflugfelden; Wolfgang Schaal, Backnang, all of Germany

[73] Assignee: Filterwerk Mann & Hummel GmbH, Ludwigsburg, Germany

[21] Appl. No.: 570,940

[22] Filed: Dec. 12, 1995

[30] Foreign Application Priority Data

Dec. 23, 1994 [DE] Germany .................. 44 46 261.1

[51] Int. Cl.⁶ .................................................. B01D 29/15
[52] U.S. Cl. .................. 210/791; 210/798; 210/411; 210/412; 210/497.1; 210/498; 29/896.62
[58] Field of Search .................... 29/896.6, 896.62; 210/791, 798, 497.1, 411, 412, 499, 498

[56] References Cited

U.S. PATENT DOCUMENTS

| | | | |
|---|---|---|---|
| 3,750,885 | 8/1973 | Fournier | 210/497.1 |
| 4,133,379 | 1/1979 | Nuzman et al. | 210/497.1 |
| 4,428,423 | 1/1984 | Koehler et al. | 210/497.1 |
| 4,693,835 | 9/1987 | Arai | 210/497.1 |
| 4,830,747 | 5/1989 | Kubota et al. | 210/411 |
| 5,462,678 | 10/1995 | Rosaen | 210/798 |

*Primary Examiner*—W. L. Walker
*Attorney, Agent, or Firm*—Evenson, McKeown, Edwards & Lenahan P.L.L.C.

[57] ABSTRACT

A gap filter for liquids of gases which has a filter body 13 which encloses a clean space within a filter housing and separates it from a dirt space. The filter body 13 is supported by an element which is constructed as a safety filter 14.

9 Claims, 2 Drawing Sheets

GAP FILTER FOR LIQUIDS OR GASES

BACKGROUND OF THE INVENTION

This invention relates to a gap filter for a liquid or gas stream comprising a filter body through which the stream passes. The filter body comprises a plate which has slot shaped openings, encloses a clean space within a filter housing, separates the clean space from a dirty space, and is supported on the clean space side by a supporting element.

A gap filter of this type is known from German Utility Model No. DE-GM 89 04 689. It comprises a hollow-cylindrical filter body which is formed of a wire coil through which the flow passes from the outside to the inside. A scraper for cleaning the filter body is arranged on the circumference of the filter body. Dirt detached from the filter body passes through an outlet valve to a dirt discharge duct. In addition to the scraper, a wire brush is provided for removing the dirt from the filter gaps.

A disadvantage of this construction is that only dirt which superficially adheres to the filter body can be removed. During operations in practice, it has been found that particles which are approximately the same size as the width of the filter gap remain caught in the filter gap and cannot be removed by the scraper or the brush.

Another disadvantage is that if there is a defect in the filter body, the fluid can pass to the clean side without being filtered or cleaned, so that the filtering effect is therefore reduced. Although it is known to additionally provide so-called safety filters or guard filters, these require relatively high expenditures and additional space.

SUMMARY OF THE INVENTION

It is therefore an object of the invention to provide a gap filter for liquids or gases which can be cleaned in a reliable manner.

It is also an object of the invention to provide a gap filter for liquids or gases which is not subject to the aforementioned disadvantages.

These and other objects the invention are achieved by providing a gap filter according to the invention.

It is an advantage of the invention that the safety filter is integrated directly in the filter, and that elements of the gap filter—specifically the supporting element—are constructed as safety filters. Thus an additional safety filter is unnecessary.

In accordance with another embodiment of the invention, the safety filter comprises supporting webs on which a wound profiled wire is arranged. This profiled wire is constructed in the manner of a wire gap filter.

In accordance with another embodiment of the invention, the profiled wire, which is used for the safety filter, is constructed in the form of a triangle with the tip of the triangle pointing to the filter body. As a result, a reduction of the effective filter surface is avoided. The filter body rests directly against the tips of the triangular profiled wire.

In a preferred process according to the invention, the gap filter is cleaned by increasing the pressure on the side of the clean-liquid space to achieve a reversed-flow effect due to the lower pressure on the dirt side. The flow reversal may take place in a pulsed manner. The pulsation results in an additional improvement of the cleaning effect.

In accordance with another embodiment of the reversed-flow process, the cleaning effect is improved by means of an ultrasonic precleaning. The ultrasonic cleaning may also be carried out in parallel to the flow reversal process.

A further aspect of the invention relates to a process for monitoring the gap filter which enables timely detection and elimination of defects in the filter body. The detection takes place in that first the time period between two cleaning cycles is determined; this time period is coupled with a comparative value; and subsequently a deviation value is obtained. If the deviation is outside a defined time frame, a signal to check the gap filter can be generated.

Another embodiment of the invention relating to the cleaning of the gap filter has the advantage that when the dirt discharge valve of a filter is opened, the flow through the filter is automatically reversed. In other words, because the clean-liquid ducts of the filters are connected directly with one another, clean liquid is conveyed under operating pressure into the filter through which the reversed flow is to take place. This cleaning liquid causes deposited dirt particles on the filter to be carried away through the dirt discharge.

After the reversal of the flow though this filter, the valves are switched and the flow can be reversed through another filter. Normally, the flow reversal takes only a few seconds, so that essentially all filters are used and thus a high filtering performance is also achieved. The valves of the filters may be controlled by means of a control circuit. Such a control circuit may, for example, be constructed of electric control elements or be integrated in an overall control. In order to reverse the flow through one of the filters, a control signal causes the switching of the two valves provided for this filter. In this case, the cleaning time is freely adjustable and depends on the average amount of dirt or solid matter which accumulates on the filter.

Naturally, it is also possible to sense the degree of contamination of a filter by measuring the pressure differential between the pressure on the unfiltered-liquid side and the pressure on the filtered, clean-liquid side and then, depending on this differential pressure, to switch the valves into the reversed-flow position. In the same manner, the duration of the flow reversal can also be controlled by measuring the differential pressure, so that a fully automatic operation of the filters is achieved while the flow reversal frequency and duration are simultaneously optimized.

According to another embodiment of the invention, it is proposed to provide additional filters each having at least one filter chamber. These filters are also connected with the first filter on the clean-liquid side and have a valve in their unfiltered-liquid inlet and in their dirt outlet. These additional filters thus comprise the same components so that, from a single type of filter module, a filter device can be constructed which can be optimally adapted to the prevailing requirements, i.e. which can be matched to the amount of liquid which is to be filtered. It is even possible with this design to subsequently expand or reduce the size of a filter installation without incurring high costs. Only one additional unfiltered-liquid inlet and one additional clean-liquid outlet need to be coupled to, or disconnected from, the existing system.

These and other features of preferred embodiments of the invention, in addition to being set forth in the claims, are also disclosed in the specification and/or the drawings, and the individual features each may be implemented in embodiments of the invention either individually or in the form of subcombinations of two or more features and can be applied to other fields of use and may constitute advantageous, separately protectable constructions for which protection is also claimed.

BRIEF DESCRIPTION OF THE DRAWINGS

The invention will be described in further detail hereinafter with reference to illustrative preferred embodiments shown in the accompanying drawings in which.

DETAILED DESCRIPTION OF PREFERRED EMBODIMENTS

Figure 1:
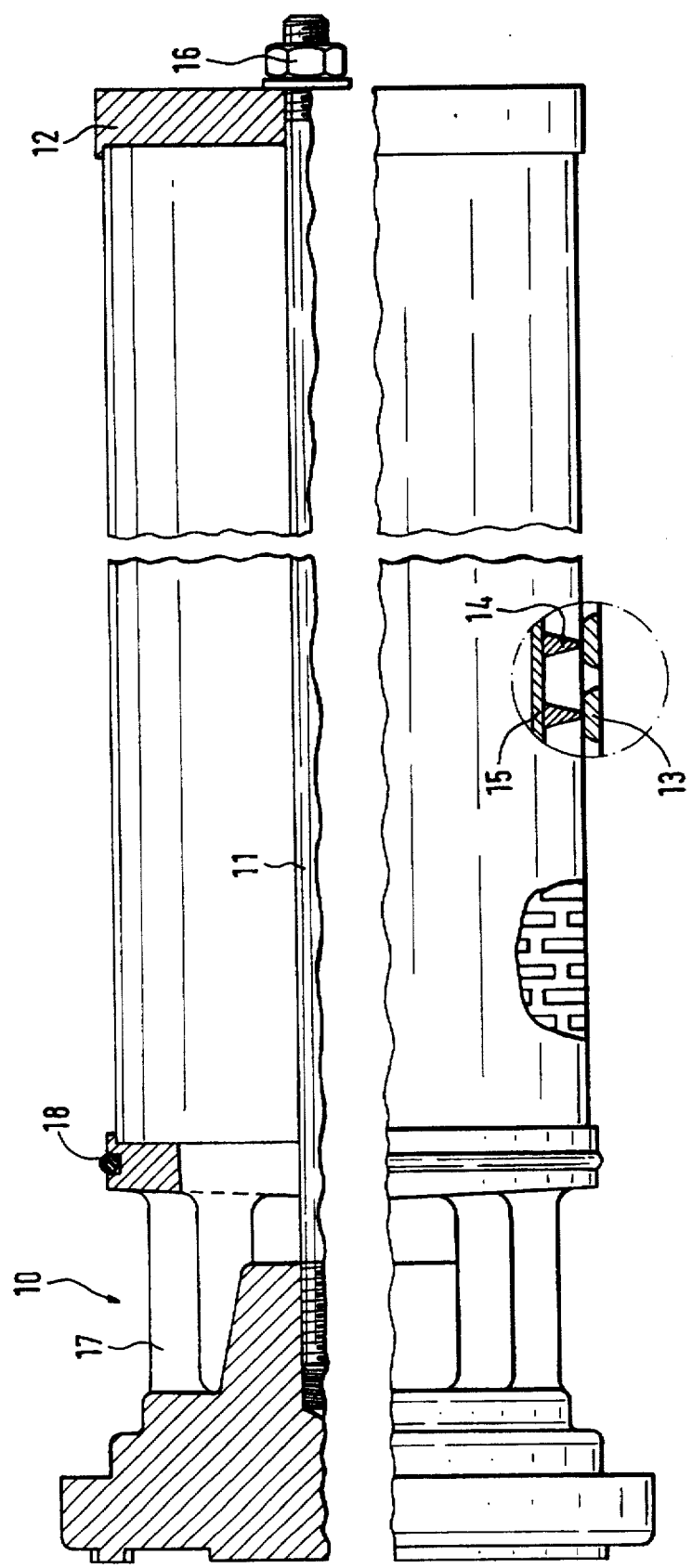
FIG. 1 is a partial sectional view of a filter body.

A filter body as illustrated in FIG. 1 is used, for example, with a gap filter of the type disclosed in German Utility Model No. DE-GM 92 09 856.8. This filter body comprises a support body 10. A bottom plate 12 is attached to this support body 10 by means of a center rod 11. On its free end, the center rod 11 is provided with a thread onto which a nut 16 is screwed. A cylindrical filter plate 13 with slot-shaped openings therethrough is clamped in between the support body 10 and the bottom plate 12. This filter plate rests against a safety filter 14 which is formed of triangular profiled wires. As illustrated, the tips of the triangular profile point outwardly toward the filter plate 13 so that the effective filter surface formed by the filter plate 13 is not reduced. The safety filter 14 is connected to support strips 15 which extend longitudinally parallel to the axis of the filter element. The liquid to be filtered flows against the filter plate from the outside. The dirt from the liquid is deposited on the outside of the filter plate 13. The filtered, clean liquid leaves the filter element through a clean-liquid outlet 17. A sealing ring 18 is provided for separating the unfiltered-liquid area from the clean-liquid outlet 17.

Figure 2:
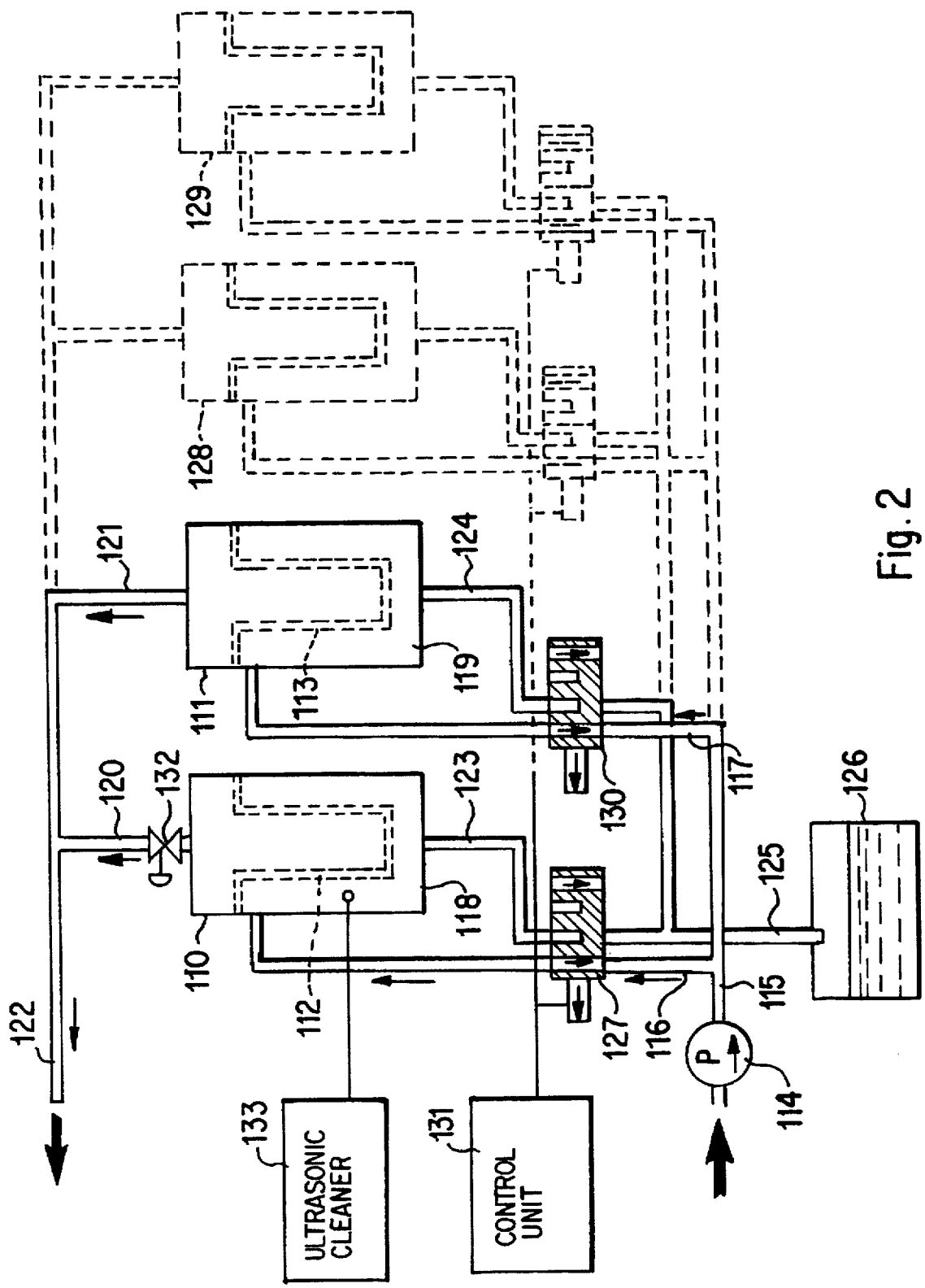
FIG. 2 is a schematic diagram of a filter device with several filters.

The filter device illustrated in FIG. 2 is used, for example, for cleaning liquids and consists essentially of filter devices 110, 111 which are equipped with filter body inserts 112, 113.

Unfiltered liquid is delivered by a pump 114 from a machine (not shown in the drawing) through lines 115, 116, 117 into the unfiltered-liquid spaces 118 and 119 of the filter devices 110 and 111, respectively. The dirt, that is, in this case, the entrained particles, are deposited on the outer surfaces of the filter bodies 112, 113. The cleaned liquid leaves the filter devices via ducts 120, 121.

Ducts 120 and 121 lead into a common duct 122 through which the cleaned liquid leaves the system. A dirt outlet is provided at the bottom of each of the filter devices 110 and 111. Dirt which has accumulated in the filter device can be conveyed through ducts 123, 124 to a common dirt collecting duct 125 which leads into a collecting vessel 126. The supply ducts for the unfiltered liquid 116, 117 as well as the ducts for the dirt discharge 123, 124 are connected with valves 127, 130. A control unit 131 is provided for selectively actuating the valve means of each filter module. Control unit 131 may also be used to monitor the operation of the filter by keeping track of the time between successive backwashings and/or to pulse the backwashing of the filter element and/or to adjust the ratio of the time the unfiltered-liquid inlet is open and the dirt discharge is closed to the time the unfiltered-liquid inlet is closed and the dirt discharge is open as described above.

In the valve position illustrated in FIG. 2, the ducts 116, 117 are opened in order to supply unfiltered liquid. The ducts 123, 124 for the dirt outlet are closed. When unfiltered liquid is delivered by the pump 114, it is filtered in the two filter devices 110, 111 and leaves the filter devices 110, 111 through ducts 120, 121.

If the slide valve 130 is switched by shifting to the left in the drawing, supply line 117 will be closed, and dirt removal line 124 will be opened. Due to the fact that the pressure in discharge line 121 is greater than the pressure in dirt removal line 124, the flow in filter unit 111 will be automatically reversed so that dirt particles accumulated on the surface of filter body 113 will be backwashed into dirt discharge line 124. If desired, a controllable valve 132 may be provided on the filtered-liquid outlet of each filter module in order to regulate the amount of the reverse flow through the filter module. Valve 132 may be a ball valve, a flap valve, a diaphragm or some other similar type of adjustable valve.

Optionally, an ultrasonic unit 133 may be provided for subjecting the filter elements of the filter modules to ultrasonic cleaning. Ultrasonic cleaning may be carried out as a precleaning operation prior to backwashing, or it may be carried out as a parallel cleaning simultaneously with backwashing.

FIG. 2 also illustrates two additional filter devices 128, 129 by means of broken lines. These may expand the overall filter system, in which case this expansion is not limited to one or two filter devices but, depending on the application, an arbitrary number of devices may supplement the system. The construction of these filter devices 128, 129 is identical to that of the filter devices 110 or 111. Thus, the individual filter modules of the invention may be coupled to one another in order to increase the filtering capacity.

The foregoing description and examples have been set forth merely to illustrate the invention and are not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A gap filter for filtering a fluid stream comprising
a filter housing;
a filter body disposed inside said housing through which the stream passes, said filter body comprising a cylindrical filter plate with slot-shaped openings therethrough, said filter plate enclosing a clean fluid chamber and separating the clean fluid chamber from an unfiltered fluid chamber, and
a support element supporting the filter body on the side of the clean fluid chamber, said support element comprising a safety filter.

2. A gap filter for filtering a fluid stream comprising
a filter housing;
a filter body disposed inside said housing through which the stream passes, said filter body comprising a filter plate with slot-shaped openings enclosing a clean fluid chamber and separating the clean fluid chamber from an unfiltered fluid chamber, and
a support element supporting the filter body on the side of the clean fluid chamber, said support element comprising a safety filter, and said safety filter comprising at least one longitudinally extending support on which a wound profiled wire is arranged such that the profiled wire forms a gap filter.

3. A gap filter according to claim 2, wherein said profiled wire has a triangular cross-sectional shape, and a tip of the triangle is directed toward said filter body.

4. A gap filter according to claim 3, wherein the filter body rests against the tip of the triangular profiled wire.

5. A process for cleaning a gap filter for filtering a fluid stream comprising a filter housing; a filter body disposed inside said housing through which the stream passes, said filter body comprising a filter plate with slot-shaped openings enclosing a clean fluid chamber and separating the clean fluid chamber from an unfiltered fluid chamber, and a support element supporting the filter body on the side of the clean fluid chamber, said support element comprising a safety filter, and said safety filter comprising at least one longitudinally extending support on which a wound profiled wire is arranged such that the profiled wire forms a gap filter; said process comprising providing a higher fluid pressure in said clean fluid chamber than in said unfiltered fluid chamber, thereby reversing the flow of fluid through said filter body and backwashing dirt particles, which have accumulated on said filter body, into a dirt discharge line.

6. A process according to claim 5, wherein the flow reversal is effected in a pulsed manner.

7. A process according to claim 5, wherein said filter body is subjected to ultrasonic cleaning.

8. A process according to claim 7, wherein said filter body is precleaned ultrasonically prior to the flow reversal.

9. A process according to claim 7, wherein said filter body is cleaned ultrasonically simultaneously with the flow reversal.

* * * * *